Nov. 22, 1927.

E. LARSEN 1,649,961

AUTOMOBILE SAFETY NET

Filed June 10, 1927

2 Sheets-Sheet 1

INVENTOR
Einar Larsen
BY
ATTORNEY

Nov. 22, 1927.  1,649,961
E. LARSEN
AUTOMOBILE SAFETY NET
Filed June 10, 1927   2 Sheets-Sheet 2

INVENTOR
Einar Larsen
BY
ATTORNEY

Patented Nov. 22, 1927.

1,649,961

UNITED STATES PATENT OFFICE.

EINAR LARSEN, OF PRINCETON, NEW JERSEY.

AUTOMOBILE SAFETY NET.

Application filed June 10, 1927. Serial No. 197,816.

This invention relates to improvements in automobile safety-nets, and has for its object to provide a device that will remedy a long felt need, and make automobile traffic less perilous to pedestrians, as this device may be operated and put into use with the quickness of thought; and once applied will prevent any serious injury to a person as the result of being struck by an automobile, even when this is driven at high speed.

Another object of my invention is to construct a device that, besides preventing serious injury to a person when rammed by a car, will serve as a shock-absorber and thus further lessen the effect of such impact.

Still another object is to provide a device, as described, that may be attached to any automobile at a very small cost, and which, when not in use, may be retained in a position, where it will in no way mar the appearance of said car.

The said device will always be ready for instant action and in case of foggy weather with wet and slippery streets it would be preferable to have said net unfolded, or in operation, ready for all eventualities.

It should be very durable, and on account of its simplicity inexpensive to manufacture.

Figure 1:
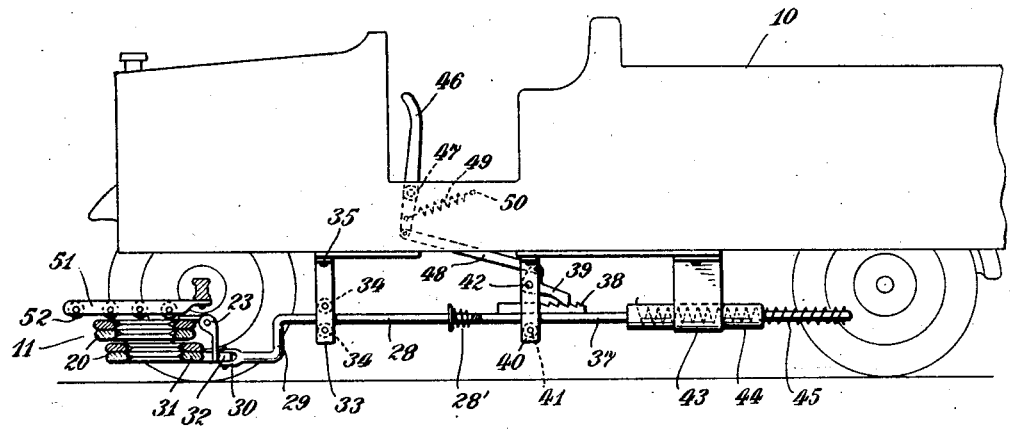
Figure 2:
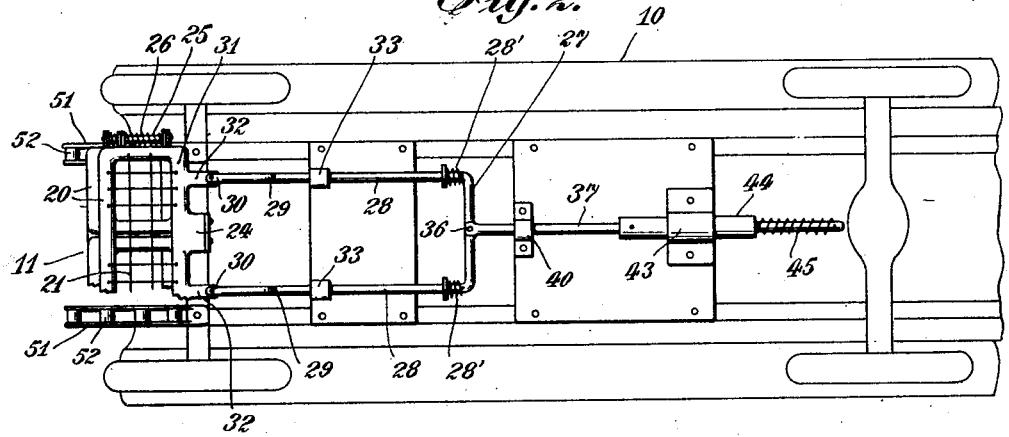
Figure 3:
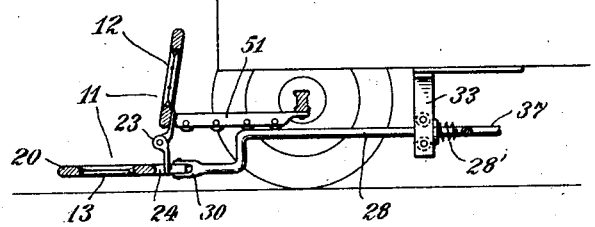
Figure 4:
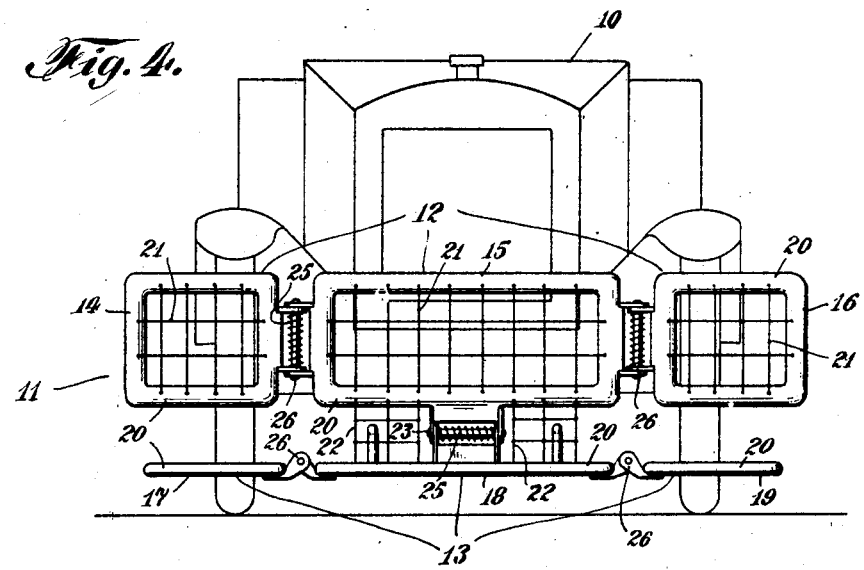
Figure 5:
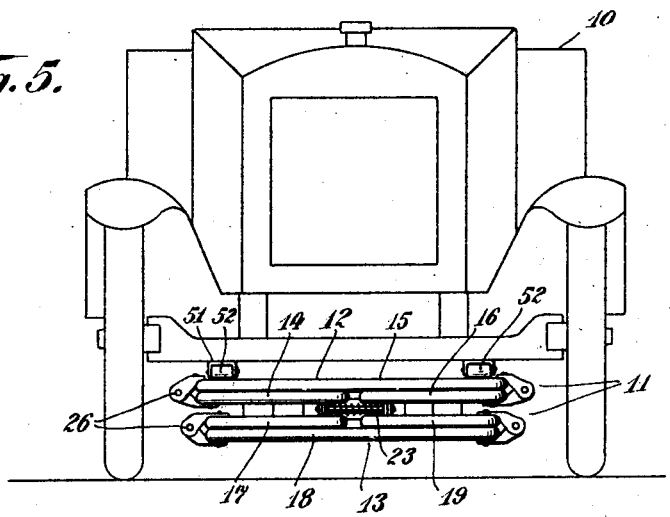
Figure 6:
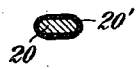

With the above and other objects in view, this invention consists of the novel features of construction, combination and arrangements of parts, hereinafter fully described, claimed, and illustrated in the accompanying drawings forming parts of this specification, and in which similar characters of reference indicate corresponding parts in all views, and in which:

Figure 1 is a side elevation of an automobile, in section, with my device attached, but not in operation; Fig. 2 is a bottom view of a car showing my device attached; Fig. 3 is a detail sectional view of my device in operation; Fig. 4 illustrates a front view of a car with my device in operation, while Fig. 5 is a similar view with the safety net folded and at rest, and Fig. 6 is a detail view.

Referring more particularly to the drawings 10 indicates an automobile, having attached to it a safety-net 11. Said safety-net comprises two sections 12 and 13; and each section consists of three segments 14, 15, 16 and 17, 18, 19, respectively. The said segments are all of a rectangular shape, each comprising metal frames 20, with a suitable network 21 extending between said frame-members of each segment, as clearly shown in Fig. 4. The frame members are provided with a suitable rubber coating 20' as shown in Fig. 6, to absorb the impact when striking an object. The middle and incidentally, correspondingly larger segments 15 and 18 have their adjoining frame-members also connected by a netting 22. The said frame-members are further connected by a hinge 23, for the purpose of which the lower member 18 is provided with a neck portion 24, as shown in Figs. 2 and 3, in order to allow sufficient intermediate space for folding and unfolding said segments. The different segments of each section are connected, as shown, by hinges 26, and adapted to be folded upon themselves, and in turn each section upon each other, as shown in Figs. 1 and 2; while the unfolding, or spreading out, of said safety-net is accomplished by means of actuating springs 25. In this connection it is to be noted, that the segments 14 and 16 are of larger dimensions than the opposite sections 17 and 19, as shown, in order that the former may pass the latter without any difficulty, when the device is sprung open. The said network may consist of cord, wire, or any suitable material, with the modification, that if made of wire the netting at 22 may be omitted, or made from cord, or any flexible material to permit of folding.

The said safety-net is operated by means of a skeleton 27, easily attached to an automobile and comprising a substantially rectangular shaped member 28, which in turn has two angular bends 29, and is terminated in two bifurcated end pieces 30, adapted to be rigidly connected to the inner frame 31 of the segments 18 by means of two projections 32, formed on said frame; said connections may be accomplished by screws, bolts or in any suitable manner. The member 28 is provided with buffer-springs 28' and is adapted to slide through two brackets 33, provided with roller-bearings 34; said brackets may each consist of a metal member bent upon itself and having its upper end rigidly attached to the bottom of the chassis, as shown at 35. To the member 28 is rigidly connected, as shown at 36, a rod 37 having to its upper surface near said latter point of connection rigidly attached an indented member 38 adapted for engagement with a pawl 39. The said rod 37 is extended rearwardly passing through another bracket 40; the latter having a roller-bearing 41, and a seat 42, upon which is pivotally mounted the aforesaid pawl 39. The rod 37 has finally its rear-end-portion supported by a bracket 43 to which further is rigidly attached a hood 44, adapted to shield a coiled spring 45, when the latter is in relaxed position.

The said spring is attached to the extreme portion of the rod 37 actuating the same. The brackets 40 and 43 are rigidly fastened to the bottom of the chassis.

While the operation of said device may be accomplished in different manners, I have shown in the present embodiment of my idea a very simple lever-system, comprising a handle 46 pivotally inserted through the bottom of a car, as shown at 47, and being connected to a lever-member 48, which in turn connects with the lever, or pawl, 39. A spring 49 has one end attached to the bottom of a car, as shown at 50, while the other end engages the extended handle-member 46, thereby keeping the latter in fixed position, simultaneously controlling the pawl-member, and in turn the movement of said device.

It will readily be seen and understood that by exerting a pressure in a backward direction upon the said handle 46, the latter will in moving to the rear by way of the intermediate member 48 cause the pawl 39 to be disengaged from connection with the notched member 38, incidentally permitting the spring 45 to be relaxed, whereby a thrust in a forward direction is imparted to the rod 37 with its member 28 carrying the wing-net-mechanism, causing said wings to unfold, as the result of the springs inserted between the different wing-sections.

In order to steady and facilitate the operation and movement of said safety-net, there are to the front part of the car, in this present embodiment, to the front axle, rigidly attached two forwardly projecting guiding members 51 carrying roller-bearings 52.

It is obvious that changes may be made in the form, construction and arrangement of the several parts, as shown, within the scope of the appended claims, without departing from the spirit of the invention, and I do not therefore limit myself to the construction and arrangement shown and described herein.

What I claim as new, and desire to secure by Letters Patent of the United States, is:

1. An article as described, comprising a plurality of frames hingedly connected and provided with springs to effect the unfolding of said frames, the latter being each formed with a network; backwardly extending lugs upon one of said frame-members for the purpose of engaging bifurcated sections of a bent rod forming part of an operating skeleton, and means for actuating and controlling said device.

2. An automobile safety-net comprising a system of collapsible wings forming two major-sections, each consisting of a large middle member and two smaller end-members, hinges connecting, and springs for unfolding said members, means for engagement of said wing-system with an operative structure, and means for actuating and controlling the same.

3. A device of the class described, comprising a plurality of wing-members, means for attaching said members to a substantially rectangular formed frame carrying buffer-springs and being supported by a couple of brackets, a rod connected to said frame and extending backwardly, the said rod having its upper surface provided with a notched member, and a spring mounted on its end-portion; brackets for the support of said rod, a pawl-member for engagement with said notched portion, and means for setting off and controlling said combination, actuated by said latter spring and guiding members attached to the front of a car to facilitate the operation of the safety-net, substantially as shown and described.

Signed at New York city, in the county of New York and State of New York this 12th day of May A. D. 1927.

EINAR LARSEN.